Dec. 22, 1925.  
F. W. RIDGLEY  
CHICKEN ROOST  
Filed April 2, 1923  
1,566,970
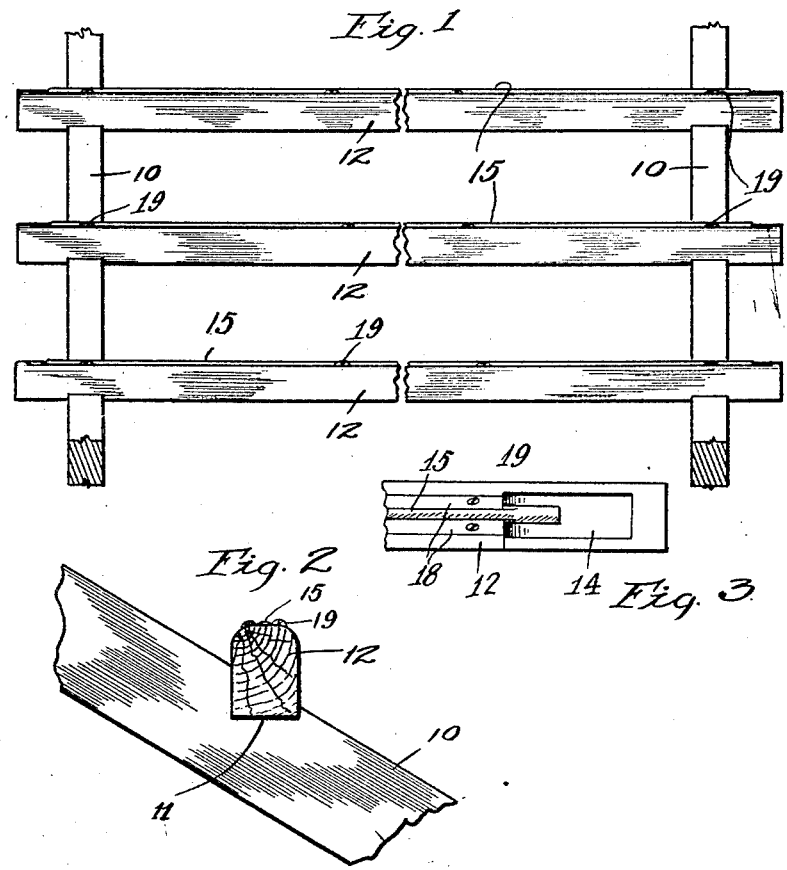
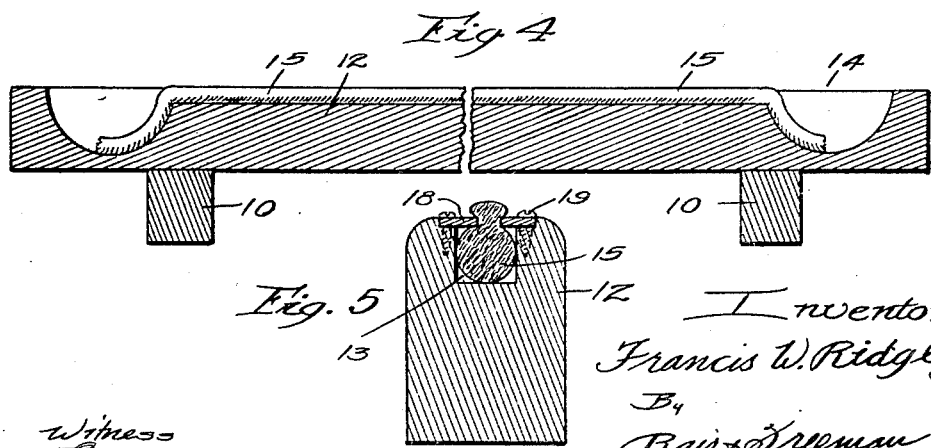
Inventor  
Francis W. Ridgley  
By  
Bair & Freeman  
Att'ys
Witness  
Lynn Latta Patented Dec. 22, 1925.

1,566,970

UNITED STATES PATENT OFFICE.

FRANCIS WM. RIDGLEY, OF EXIRA, IOWA, ASSIGNOR OF ONE-HALF TO GEORGE C. VOSS, OF EXIRA, IOWA.

CHICKEN ROOST.

Application filed April 2, 1923. Serial No. 629,312.

*To all whom it may concern:*

Be it known that I, FRANCIS W. RIDGLEY, a citizen of the United States, residing at Exira, in the county of Audubon and State of Iowa, have invented a certain new and useful Chicken Roost, of which the following is a specification.

The object of my invention is to provide a chicken roost of very simple construction, whereby it may be manufactured at a comparatively low cost enabling it to be easily marketed.

More particularly, my invention relates to a roost for chickens or poultry in which, a strip of absorbent material thoroughly saturated with insecticide is positioned in the roost directly below the feet of the poultry when roosting.

Still a further object is to provide a structure wherein the wick member may be so positioned that a greater portion thereof will serve as a reservoir for maintaining the insecticide, while only a portion thereof will be exposed.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a front elevation of my roost.

Figure 2 is an end view of one of the roosts on a supporting member.

Figure 3 is a plan view of an end of one of the roost members.

Figure 4 is a sectional view lengthwise of the roost member; and

Figure 5 is a sectional view crosswise of the roost member.

In the accompanying drawings I have used the reference numeral 10 to indicate generally a pair of spaced supporting beams which may be either positioned in a horizontal plane or inclined, as desired.

The supporting members when inclined, are provided with a plurality of notches 11 so that the roost members 12 may be positioned therein. Each of the roost members 12 has its upper end curved from side to side and is also provided with a groove 13, as clearly shown in Figure 5 of the drawings.

The groove 13 runs lengthwise of the roost member and terminates short of the ends thereof. At the ends of the groove 13, I provide a pair of openings 14.

A wick 15 of absorbent material is received in the groove 13 and its ends project down into the pair of openings 14 arranged at the ends of the groove 13.

Insecticide of any suitable kind may be poured into the openings 14 and will immediately cause the wick 15 to be thoroughly saturated. The openings 14 provide suitable places for supplying the insecticide. The insecticide will become thoroughly saturated through the wood of the roost member 12.

Terminating the wick, short of the ends of the roost member will tend to hold the insecticide within the roost member and prevent the insecticide from flowing out of the ends of the roost member.

A pair of shoulders 17 are formed in the roost member adjacent to each of the sides of the groove.

I place a pair of slats 18 upon the shoulders 17. The slats 18 project over a portion of the groove 13 so that a narrow opening is formed between the adjacent edges of the slats 18. The slats 18 are secured in position by means of nails or screws 19.

The wick 15 projects through the opening formed between the slats 18 and has a portion thereof project up beyond the slats 18.

It will be noted that the main portion of the wick, which is received below the slats 18, serves as a reservoir for containing the insecticide.

A narrow strip or part of the wick 15 will always be in contact with the chicken's feet. The arrangement of the structure enables the insecticide to remain a considerable length of time in the wick 15.

I have provided a structure which can be manufactured very easily and which can be marketed at a comparatively low cost.

Some changes may be made in the construction and arrangement of the various parts of my invention, without departing from the real spirit and purpose of my invention and it is my intention to cover by my claim, any modified forms of structure or use of mechanical equivalents, which may be reasonably included within its scope.

I claim as my invention:

A chicken roost of the class described, including a roost member having its longitudinal upper edges rounded, a groove running lengthwise in the top thereof, said groove being deepened near the ends of said roost member and terminating short of said ends for forming germicide retaining wells, a wick adapted to rest in said groove, having its ends extending into said wells, a shoulder adjacent each side of said groove, slats on said shoulders for pinching said wick for retaining it in said groove and for causing a portion thereof to extend above said slats where said portion may come in contact with fowls roosting on said roost.

Des Moines, Iowa, March 21, 1923.

FRANCIS WM. RIDGLEY.